United States Patent
Young et al.

(10) Patent No.: US 12,259,738 B2
(45) Date of Patent: *Mar. 25, 2025

(54) SYSTEMS AND METHODS FOR OPERATING A BALL VALVE

(71) Applicant: WCM Industries, Inc., Colorado Springs, CO (US)

(72) Inventors: Gabriel Young, Colorado Springs, CO (US); William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 56 days.

This patent is subject to a terminal disclaimer.

(21) Appl. No.: 18/303,009

(22) Filed: Apr. 19, 2023

(65) Prior Publication Data

US 2023/0251673 A1    Aug. 10, 2023

Related U.S. Application Data

(63) Continuation-in-part of application No. 17/334,342, filed on May 28, 2021, now Pat. No. 11,639,757.

(60) Provisional application No. 63/045,502, filed on Jun. 29, 2020.

(51) Int. Cl.
G05D 3/10     (2006.01)
F16K 5/06     (2006.01)
F16K 31/04    (2006.01)

(52) U.S. Cl.
CPC ............ *G05D 3/10* (2013.01); *F16K 5/0652* (2013.01); *F16K 31/042* (2013.01)

(58) Field of Classification Search
CPC .................................................... F16K 5/0652
See application file for complete search history.

(56) References Cited

U.S. PATENT DOCUMENTS

| 3,387,748 A | | 6/1968 | Brenchley | |
| 3,649,842 A | * | 3/1972 | Thornhill | G05D 11/132 307/106 |
| 4,725,041 A | | 2/1988 | Chauvin | |
| 2003/0016164 A1 | | 1/2003 | Finke | |
| 2006/0124156 A1 | | 6/2006 | Jackson | |
| 2008/0093574 A1 | | 4/2008 | Ohta | |
| 2009/0321674 A1 | | 12/2009 | Madden | |
| 2010/0217443 A1 | | 8/2010 | Hagler | |
| 2018/0299021 A1 | | 10/2018 | Narukawa | |
| 2022/0235644 A1 | | 7/2022 | Orlov | |
| 2022/0260173 A1 | | 8/2022 | Turek | |

* cited by examiner

*Primary Examiner* — Kevin R Barss (57) ABSTRACT

Aspects of the disclosure relate to providing a pulse control to a ball valve to reduce the amount of torque required to adjust the position of the ball valve. In an aspect, the technology relates to a method for reducing resistance of a ball valve. The method includes generating a pulse having a duration and a polarity; providing the pulse to an actuator configured to rotate a ball of the ball valve; and rotating, by the actuator, the ball of the ball valve by an amount based on the duration of the pulse and a direction based on the polarity of the pulse, wherein the ball valve does not change state after rotation of the ball.

20 Claims, 7 Drawing Sheets

SYSTEMS AND METHODS FOR OPERATING A BALL VALVE

RELATED APPLICATION

This application is a continuation in part of U.S. patent application Ser. No. 17/334,342, filed May 28, 2021, which claims the benefit of U.S. Provisional Application No. 63/045,502, filed Jun. 29, 2020, and titled SYSTEMS AND METHODS FOR OPERATING A BALL VALVE, the entireties of which are incorporated herein by reference. To the extent appropriate, a claim for priority is made to each of the above-described applications.

INTRODUCTION

Valves provide for the control of fluid. One type of valves available is a ball valve. A ball valve controls the flow of a fluid, such as a liquid or a gas, through the use of a rotary ball having a bore through the ball. In one position of the ball, the bore is aligned with the pipe or tubing, which allows for fluid to flow through the valve. When the ball is turned 90 degrees (e.g., a quarter turn) or less, flow of the fluid through the valve is blocked or slowed. Control of a ball valve may be performed by a manual control, such as a lever, or by other controls, such as electric or pneumatic controls.

It is with respect to this general technical environment that aspects of the present technology disclosed herein have been contemplated. Although a general environment has been discussed, it should be understood that the examples described herein should not be limited to the general environment identified herein.

SUMMARY

Aspects of the disclosure relate to providing a pulse control to a ball valve to reduce the amount of torque required to adjust the position of the ball valve. In an aspect, the technology relates to a method for reducing resistance of a ball valve. The method includes generating a pulse having a duration and a polarity; providing the pulse to an actuator configured to rotate a ball of the ball valve; and rotating, by the actuator, the ball of the ball valve by an amount based on the duration of the pulse and a direction based on the polarity of the pulse, wherein the ball valve does not change state after rotation of the ball.

In an example, the method further includes determining a position of the ball valve; and based on the determined position of the ball valve, setting the polarity of the pulse. In another example, the position of the ball valve is fully closed; and the polarity is set to cause the actuator to rotate the ball towards the fully open position. In a further example, the position of the ball valve is fully open; and the polarity is set to cause the actuator to rotate the ball towards the fully closed position. In yet another example, the duration is set based on inputs received from input components provided in valve circuitry connected to the ball valve. In still another example, the actuator rotates the ball less than five degrees. In still yet another example, the method further includes providing, to the actuator, a subsequent pulse having a polarity opposite the polarity of the pulse. In another example, the pulse is generated locally by valve circuitry connected to the ball valve.

In another aspect, the technology relates to a method for reducing resistance of a ball valve. The method includes generating a series of pulses, including a first pulse and a second pulse. The first pulse has a first duration and a first polarity; and the second pulse has a second duration and a second polarity, wherein the second polarity is opposite the first polarity. The method further includes transmitting the series of pulses to an actuator configured to control the position of a ball of the ball valve.

In another example, the first pulse and the second pulse are provided as a first pulse pair. In a further example, the first duration is the same as the second duration. In yet another example, the series of pulses includes a second pulse pair that includes a third pulse and a fourth pulse; and the second pulse pair is provided a period (P) after the first pulse pair is provided. In still another example, the second pulse is provided a time interval (T) after the first pulse is provided, wherein a ratio between the time interval (T) and the period (P) is less than 1/100. In still yet another example, the period (P) is at least one hour. In yet a further example, the method further includes receiving, by the actuator, the series of pulses; and rotating, by the actuator, the ball of the ball valve according to the series of pulses. In another example, the series of pulses are generated and transmitted by a utility control device located remotely from the ball valve. In yet another example, the method further includes transmitting, by the utility control device, the series of pulses to at least one additional ball valve.

In another aspect, the technology relates to a system that includes a ball valve including a ball having a bore; a pulse generator configured to generate a series of pulses; and an actuator configured to rotate the ball of the ball valve based on the series of pulses generated by the pulse generator. In an example, the system further includes a utility control device that is located remote from the ball valve, wherein the utility control device includes the pulse generator. In another example, the system further includes input components for receiving inputs to alter characteristics of the series of pulses.

In another aspect, the technology relates to a method for rotating a ball valve having a ball and an actuator. The method includes applying, at a first time, an open signal to the actuator of the ball valve when the ball valve is in a fully closed state; receiving, at a second time, a first signal from a close limit switch of the ball valve, the first signal indicating the ball has begun rotation; receiving, at a third time, a second signal from an open limit switch of the ball valve, the second signal indicating the ball has rotated into the fully open position; based on the first time and the second time, determining a delay time; based on the second time and the third time, determining a rotation time; based on the delay time, the rotation time, and a number of degrees the ball rotated from the fully closed state to the fully open state, determining a pulse duration; generating a pulse having the determined pulse duration; providing the pulse to the actuator; and rotating, by the actuator, the ball of the ball valve by an amount based on the duration of the pulse. In an example, the ball valve does not change state after rotation of the ball.

In another aspect, the technology relates to a system for reducing resistance of a ball valve. The system includes a ball valve, comprising a ball with a bore. The system also includes an actuator, operatively connected to the ball valve, and configured to rotate the ball of the ball valve. The system further comprises pulse generator circuitry, operatively connected to the actuator and configured to generate a first pulse having a duration and a first polarity; and provide the first pulse to the actuator to rotate the ball of the ball valve by an amount based on the duration of the first pulse and a direction based on the first polarity, wherein the ball valve does not change state after rotation of the ball by the amount.

In another example, the technology relates to another for reducing resistance of a ball valve. In examples, the system includes pulse generator circuitry, configured to perform a method. In examples, the method includes generating a series of pulses, including a first pulse and a second pulse, wherein: the first pulse has a first duration and a first polarity; and the second pulse has a second duration and a second polarity, wherein the second polarity is opposite the first polarity. The method also may include transmitting the series of pulses to a first actuator configured to control the position of a ball of a first ball valve.

In still another example, the technology relates to another system, including a utility control device comprising circuitry configured to perform a method. In examples, the method includes causing a first series of pulses to be generated, including a first pulse and a second pulse, wherein: the first pulse has a first duration and a first polarity; and the second pulse has a second duration and a second polarity, wherein the second polarity is opposite the first polarity. The method may also include causing the first series of pulses to be transmitted to a first actuator configured to control the position of a first ball of a first ball valve. In examples, the method may further comprise causing a second series of pulses to be generated, including a third pulse and a fourth pulse, wherein: the third pulse has a third duration and a third polarity; and the fourth pulse has a fourth duration and a fourth polarity, wherein the fourth polarity is opposite the third polarity. Further, the method may include causing the second series of pulses to be transmitted to a second actuator configured to control the position of a second ball of a second ball valve, wherein the third duration is different from the first duration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

The following drawing figures, which form a part of this application, are illustrative of aspects of systems and methods described below and are not meant to limit the scope of the invention in any manner, which scope shall be based on the claims.

DETAILED DESCRIPTION

As discussed above, a ball valve controls the flow of fluid through the valve by rotating a ball that has a bore through the ball. Traditionally, rotation of the ball was controlled manually. Newer methods allow for electronic control of the ball valve. To open or close the ball valve, some amount of torque is required to rotate the ball. With electronic controls, the amount of torque that may be applied by an electronic actuator is typically limited. The torque applied by the electronic actuator is generally described or rated in two ways. The first torque rating is the "breakaway torque," which is the amount of torque required to start the rotation or unseat the ball. The second torque rating is the "run torque," which is the amount of torque needed to keep rotating. The breakaway torque is often higher than the run torque. Increasing the breakaway torque rating of an electric actuator becomes increasingly difficult and expensive, particularly where there are size limitations of the actuator.

When ball valves are put in use, the longer a ball valve stays in a particular position, the more likely the ball valve is to get "stuck," causing the resistance to opening or closing the valve to increase. When the ball valve "sticks," a higher breakaway torque is required to rotate the ball valve from its current position. The effect of the sticking may also be made worse depending on the type of fluid flowing through the ball valve. For instance, some fluids are more likely to cause calcifications that may increase the resistance of the valve. In some cases, the sticking effect causes the breakaway torque to increase to a point that the electronic actuator is no longer able to rotate the ball of the ball valve. The sticking effect of ball valves has been considered one of the biggest drawbacks for ball valves, particularly as compared to solenoid-based valves. Ball valves, however, have several other advantages over solenoids, such as there is no power required to hold a ball valve open or closed, there is little to no noise involved with a ball valve, and debris tends to be less of an issue. Accordingly, if the sticking effect could be alleviated or eliminated, ball valves could become more efficient and provide a better option in fluid control technologies.

The present technology provides solutions to reduce the sticking problem associated with ball valves, along with solutions to other problems. To resolve or reduce the effect of the sticking problem, the present technology provides an electric pulse to the ball valve that causes the electronic actuator to slightly rotate the ball of the ball valve. By slightly moving the ball, the sticking effect is reduced or eliminated. For instance, by rotating the ball of the ball valve, the amount of breakaway torque required to rotate the ball remains lower and within the range of the electronic actuator. The pulse may be provided at different intervals and for different durations depending on the implementation and use of the ball valve. For example, the pulse may be provided hourly, daily, weekly, or in other periods as appropriate for the particular implementation. The pulse may also have a duration that causes the electronic actuator to rotate the ball by less than a degree, one degree, two degrees or some other amount to reduce or eliminate sticking.

In addition, in some instances where the valve is normally closed, the pulse may cause the valve to slightly open to allow some amount of fluid to flow through the valve. Such an implementation may be preferable to prevent stagnant fluid, which in turn helps prevent freezing or the growth of bacteria, such as Legionella bacteria that may cause Legionnaire's disease. In other implementations where the valve is normally closed, the pulse causes a smaller rotation of the ball that results in the valve still remaining closed. Such an implementation may be preferable where the valve is controlling natural gas or other types of fluids where any type of leak is undesirable.

The pulse may be generated locally by valve circuitry or electronics that are directly attached to the valve itself. For example, the electronic control circuitry connected to the electronic actuator may include a timer configured to generate the pulse at the appropriate times and for the appropriate durations. Thus, the valve assembly or system effectively becomes a non-sticking valve that may also have additional benefits, such as preventing freezing and bacteria growth. In other examples, the pulse may be generated remotely from a control system. The control system may be configured to control a plurality of valves that are distributed in a variety of physical locations. Accordingly, different pulse timings and durations may be generated for different valves based on the particular use of each valve.

Figure 1A:
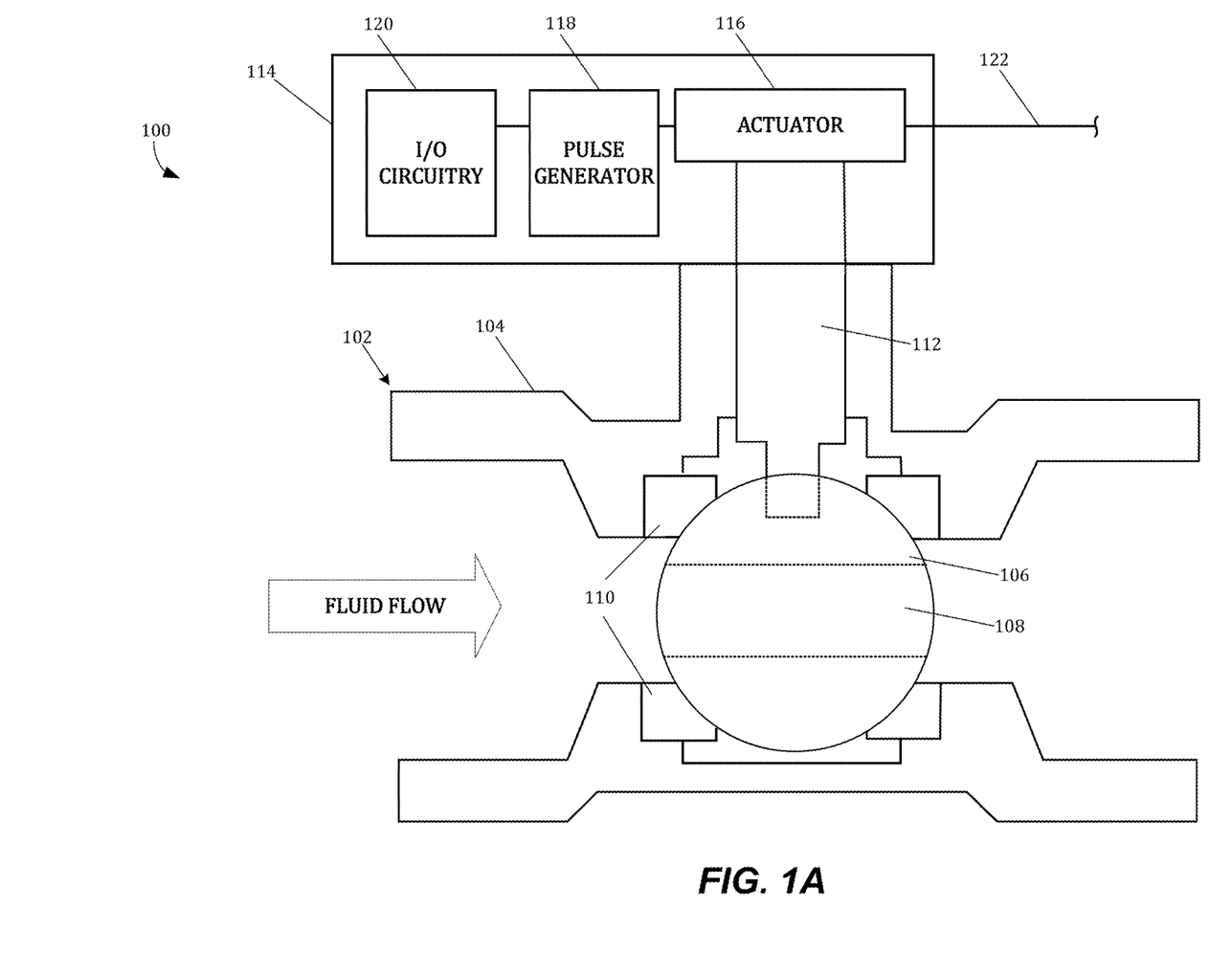
FIG. 1A depicts an example system for controlling a ball valve.

FIG. 1A depicts an example system 100 for controlling a ball valve 102. The system 100 includes the ball valve 102 and valve circuitry 114 for controlling the ball valve 102. The ball valve 102 is shown as a partial cross section. The ball valve 102 includes a valve body 104 that houses a ball 106 having a bore 108. The ball 106 rests on valve seats 110. Rotation of the ball 106 is controlled via a valve stem 112. In the example configuration depicted, the ball valve 102 is in an open position to allow fluid to flow through the ball valve 102. The ball valve 102 is in an open position when the bore 108 of the ball 106 is at least partially aligned with the fluid and/or pipe to allow for the fluid to flow through the valve 102. The ball 106 may be rotated by rotation of the valve stem 112. For example, the valve stem 112 may be used to rotate the ball 106 a quarter turn (e.g., 90 degrees) to close the valve 102. When the ball 106 is rotated 90 degrees, the bore 108 is perpendicular to the flow of fluid, and thus, no fluid passes through the valve 102.

When the ball 106 is in the 0-degree position, the valve 102 is fully open. When the ball 106 is in the 90-degree position, the valve 102 is fully closed. The ball 106 may also be positioned at different angles between 0-90 degrees to alter the amount of fluid that passes through the valve 102. For instance, when the ball 106 is in a 45-degree position, less fluid may pass through the valve 102 than when the ball 106 is in the 0-degree position. In some configurations of the ball valve 102, there may be range of degrees where the valve still remains fully closed. For instance, the valve 102 may remain fully closed (e.g., preventing fluid flow) when the ball 106 is positioned between 85-90 degrees. The valve 102 remains closed because no portion of the bore 108 is aligned or exposed to the fluid. The amount of rotation from the 90-degree position that is possible while still having the valve 102 remain closed changes depending on the configuration of the valve 102, the ball 106, and the bore 108. Although examples described herein include rotating the ball 106 between 0 and 90 degrees, it will be appreciated that in other examples, the valve 102 may be configured to rotate the ball 106 past the 90-degree position. For example, the ball may rotate fully through 360 degrees with various degrees of opening and closing of the valve 102, depending on the particular configuration of the valve 102, the ball 106, and the bore 108. Additional features regarding the different states of the valve 102 are discussed further below with reference to FIGS. 1B-1F.

The valve stem 112 is controlled electronically by the valve circuitry 114. The valve circuitry 114 may include an actuator 116, a pulse generator 118, and input/output (I/O) circuitry 120. The actuator 116 physically rotates the valve stem 112 to cause the ball 106 to rotate. The actuator 116 may include an electric motor that converts electric energy into rotational mechanical energy to rotate the valve stem 112 and the ball 106. The actuator 116 may be a two-point actuator, a three-point actuator, or a control-loop actuator, among other types of actuators. A two-point actuator generally includes three input wires or leads—a positive wire, a negative wire, and a control wire. When current flows over the control wire, the valve 102 will close or open depending on the direction of the current flow (either through the positive wire or the negative wire). A two-point or three-point actuator is generally used to fully open or fully close the valve 102. A control-loop actuator may be a 4-20 mA control actuator, among other types. In a control-loop actuator, the position of the ball 106 may be set and the position of the ball 106 may be provided or transmitted. Thus, the position of the ball 106 may be set, and the position may be known or determined. The actuator 116 may also include a modulating actuator control or digital positioning system (DPS) to control the position of the actuator 116 and the valve stem 112.

The actuator 116 may also include one or more limit switches. The limit switches define end positions for actuator 116. When the actuator 116 reaches a limit switch, power is removed, and the actuator 116 stops moving. For example, a first limit switch may be at the 0-degree position and a second limit switch may be at the 90-degree position. The limit switches may also generate signals that indicate the position or state of the valve 102.

The signals for controlling the actuator 116 may be generated locally at the valve circuitry 114 via the I/O circuitry 120 and/or generated remotely and provided via an input wire or wires 122. The I/O circuitry 120 may include various components for receiving input to control the valve 102 and/or providing output information about the state of the valve 102. The input components may include buttons, wheels, switches, etc. The input components may allow a user to set a position and/or state of the valve 102, such as fully open, fully closed, or anywhere in between. The input components may also allow for a user to set characteristics of a pulse, as discussed further below. The output components may include dials, displays (such as a seven-segment display or the like), meters, etc. The output components may convey the current position of the valve 102. In some examples, the output components may also convey the presently set characteristics of the pulse, as discussed further below.

In other examples, the actuator 116 may be controlled remotely in addition to, or alternatively to, being controlled locally. A control signal may be generated by a utility control device that is located remotely from the valve 102, as discussed further below with respect to FIG. 3. The control signal may be received by the actuator via input wire or wires 122. The control signal indicates a desired position for the valve 102, or more specifically, the position of the ball 106 within the valve 102. In other examples, the actuator 116 may receive the control signal via a wireless connection. For instance, the valve circuitry 114 may include wireless communication components that allow for transmission and receipt of wireless communications. The wireless communication components may include radio-frequency (RF) components, such as BLUETOOTH-based components, WIFI-based components, ZIGBEE-based components, among others. In such examples, the control signal may be received by the wireless components and converted into a local control signal that is provided to the actuator 116. The actuator 116 may also provide position information about the current position of the ball 106 to the wireless components that in turn transmit the position information to a remote device, such as a utility control device.

The pulse generator 118 of the valve circuitry 114 operates to locally generate an electric pulse that is provided to the actuator 116 to slightly move or rotate the ball 106 to prevent the ball 106 from sticking. The pulse generated from the pulse generator 118 may be described in terms of its characteristics, such as duration, amplitude, and polarity. The duration of the pulse may control the amount of rotation that actuator 116 rotates the ball 106. For example, the pulse duration may correspond directly to a number of degrees that the actuator 116 rotates the ball 106. The exact relationship between pulse duration an amount of rotation will vary based on the configuration of the valve 102 and the actuator 116. The amplitude of the signal, such as the voltage level of the signal, may correspond to the amount of force exerted on the valve stem 112 by the actuator 116. The polarity of the signal corresponds to the direction of rotation. For example, a positive polarity may cause the ball 106 to rotate towards the closed position (e.g., towards the 90-degree position) and a negative polarity may cause the ball 106 to rotate towards the open position (e.g., towards the 0-degree position). In other examples, the polarities may be switched depending on the wiring configuration (e.g., positive polarity may open the valve and negative polarity may close the valve). The pulse may be generated by the pulse generator 118 through a variety of techniques or components. For example, the pulse generator 118 may include a 555 timer, or similar integrated-circuit (IC) device, multivibrators, or other similar components that can be configured to generate a pulse. The 555 timer, along with other electronic components (e.g., resistors, inductors, capacitors, etc.) may be configured to produce a pulse having a desired duration, polarity, and amplitude. For example, a first variable resistor may be altered to change the pulse duration and a second variable resistor may be altered to change the frequency of the pulses. The pulse generator 118 may also or alternatively include a microcontroller, microprocessor, and/or memory configured or programmed to generate a pulse with the desired characteristics, such duration, polarity, and amplitude.

The pulse generator 118 may also generate a series of pulses automatically based on a set schedule and frequency. The rate at which the pulses are generated may be referred to as the frequency of the pulse. The frequency of the pulse may be on the order of minutes, hours, days, weeks, or months, depending on the valve 102 and the implementation of the valve 102. For example, for a valve controlling a liquid that may be more prone to causing the valve 102 to stick, a pulse may be generated every hour. For a valve controlling a gas that may be less prone to causing the valve to stick, a pulse may be generated every day or every week. In other examples, the pulse may also be generated by a manual selection of an input component to generate a pulse.

The duration, polarity, amplitude, and/or frequency of the series of pulses may be preset into firmware or the electronic components of the pulse generator 118. In other examples, the duration, polarity, amplitude, and/or frequency of the series of pulses may be based on inputs received from the input components of the I/O circuitry 120. In some examples, the input components may include access to a variable resistor or switch(es) that may be used to alter the duration, polarity, amplitude, and/or frequency of the series of pulses. In other examples, the input components may be configured to allow a user to select a direction and a number of degrees to open or close the valve 102. The input components may also include options for selecting the frequency that the pulses are generated.

In other examples, a plurality of presets may be available that correspond to the different possible implementations for the valve 102 and the type of valve 102. For instance, a series of presets may be presented for selection via an input component (e.g., dial, switch, button, etc.). The preset may correspond to a "liquid" setting or a "gas" setting. Finer presets may also be presented that are based on the type of liquid or gas, the amount of flow of the fluid, among other types of implementation details. Presets may also be based on whether any flow is desired through the valve 102 when the valve 102 is pulsed. Once a preset is selected, the duration, polarity, amplitude, and/or frequency of the pulses may be set according to the preprogrammed preset.

Figure 1B:
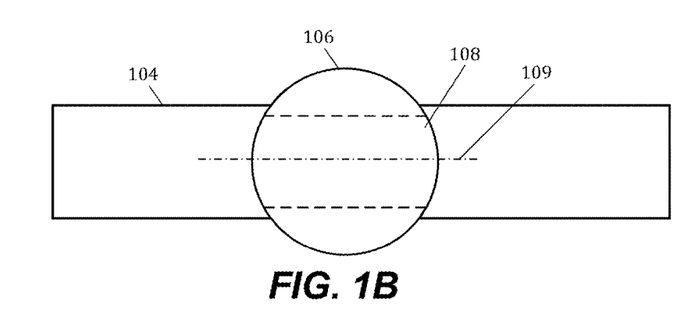
FIGS. 1B-1F depict various positions of the ball valve.
Figure 1C:
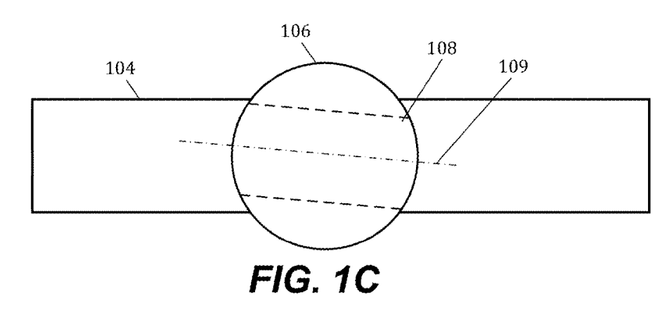

FIGS. 1B-1F depict various positions of the ball valve 102. More specifically, FIGS. 1B-1F depict a top view of the ball valve 102 depicted in FIG. 1A. The valve 102 may be in three general states: (1) fully open; (2) partially open (or partially closed), and (3) fully closed. FIGS. 1B-1C depict the valve 102 in the fully open position. In FIG. 1B, the ball 106 is in the 0-degree position. A bore axis 109 is represented in FIGS. 1B-1F to more easily see the position of the ball 106 and the bore 108. As can be seen, when that ball 106 is the 0-degree position, the bore axis 109 is aligned with the valve body 104 and the flow of fluid through the valve 102. In some examples, the ball 106 may be rotated slightly and may still remain in the fully open position. For example, FIG. 1C depicts the ball 106 being rotated 5 degrees, from the 0-degree position, towards the fully closed position. The position of the ball 106 in FIG. 1C is still considered fully open because the entire opening of the bore 108 is still exposed to the flow of fluid through the valve 102.

Figures 1D, 1E, 1F:
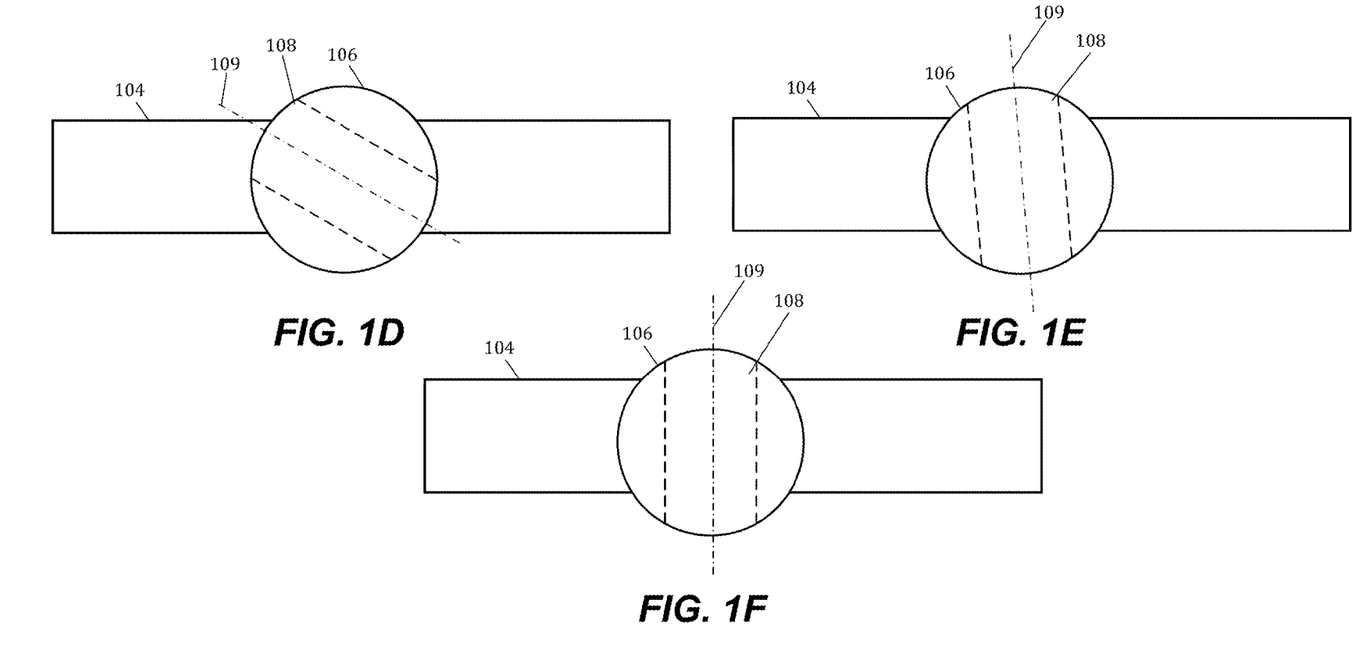

Once the ball 106 is rotated to a point where a portion of opening of the bore 108 is not open to the flow of fluid through the valve 102, the valve 102 is no longer in the fully open state. Rather, the valve 102 is then in a partially open state. The partially open state may also be referred to as the partially closed state. FIG. 1D depicts the valve 102 in the partially open or partially closed state. In FIG. 1D, the ball 106 has been rotated by 30 degrees from the 0-degree position towards the fully closed position. At the 30-degree position, only a portion of the opening of the bore 108 is exposed to the flow of fluid.

Once the ball 106 is rotated to a point where no portion of the bore 108 is exposed to the flow of fluid, the valve 102 is in the fully closed state. FIG. 1E and FIG. 1F depict the valve 102 in the fully closed state. In FIG. 1E, the ball 106 has been rotated 85 degrees from the 0-degree position towards the 90-degree position. At the 85-degree position, no portion of the opening of the bore 108 is exposed to the flow of fluid. Thus, the when the ball 106 is in the 85-degree position, the valve 102 is in the fully closed state. FIG. 1F depicts the valve 102 with the ball 106 in the 90-degree position. As should be appreciated, there are multiple positions of the ball 106 where the valve 102 may be in the fully closed state, the fully open state, or the partially open state. The range of angular positions that correspond to each state may vary between different valves and valve configurations.

In some examples, the pulses described herein may cause the ball 106 to rotate but still remain in the same state. For example, the ball 106 may begin at the 90-degree position and a pulse may cause the ball 106 to move to the 85-degree position. In such an example, the ball 106 begins and ends in the fully closed state.

Figure 2A:
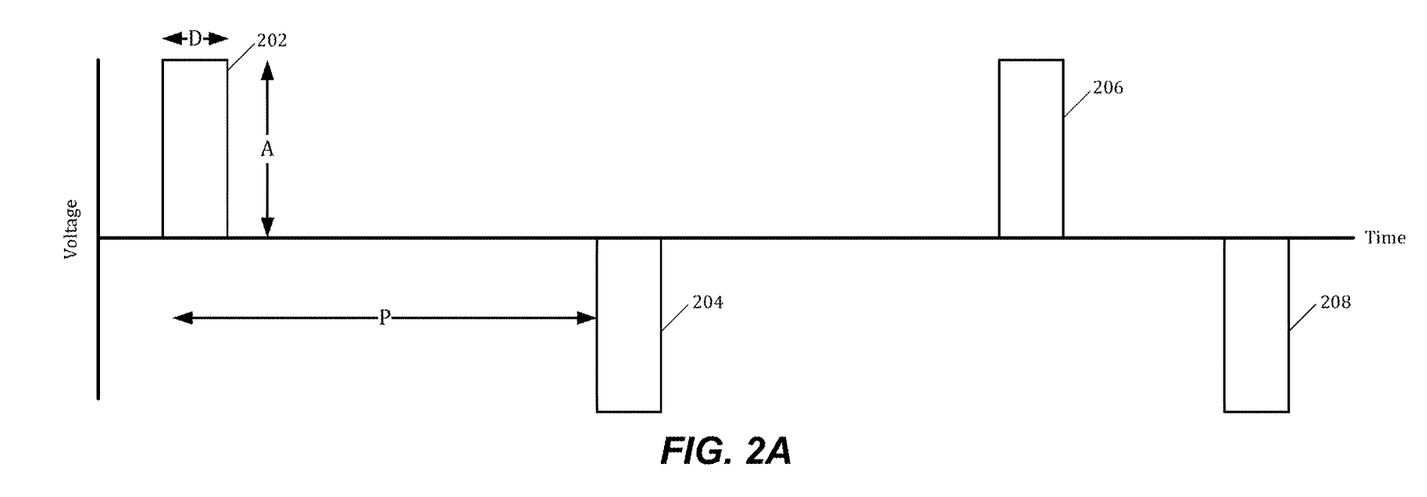
FIG. 2A depicts an example series of electrical pulses.

FIG. 2A depicts an example series of pulses 202-208. The pulses 202-208 are plotted on a graph having a y-axis of voltage and an x-axis of time. The pulses and graphs are not drawn to scale. Each of the pulses 202-208 has a duration (D) and an amplitude (A). Depending on the configuration of actuator and the valve, the duration (D) may be in the range of a few milliseconds to a few seconds. In some examples, the pulse duration may be between 50 ms to 500 ms. Pulse durations for desired amounts of rotations may be determined from a calibration process discussed in further detail below with reference to FIG. 6. Also depending on the configuration of the actuator and the valve, the amplitude of the pulse may be in the range of a few volts (e.g., 9 V, 12 V, etc.) to over a hundred volts (e.g., 110 V, 120 V, 220 V, etc.). The pulses 202-208 are separated in time by a period (P). Depending on the implementation, the period may be on the order of minutes, hours, days, weeks, or months. In one example, the period may be less than or equal to 24 hours, which corresponds to a frequency of once per day. In some examples, the duration, period, and/or amplitude of the pulse may remain constant, and in other examples, the duration, period, and/or amplitude of the pulse may vary.

In the example depicted, the first pulse 202 and the third pulse 206 have a positive polarity, and the second pulse 204 and the fourth pulse 208 have a negative polarity. Such a pulse pattern may repeat after the fourth pulse 208 for any total amount of time, such as the lifetime of the valve.

The pulse pattern depicted in FIG. 2A may be appropriate for reducing resistance of a valve (e.g., preventing the valve from sticking) that is normally in an open position, where a positive pulse causes the ball to move slightly towards the closed position. In such an example where the period is one day, the first pulse 202 may occur on a first day to slightly rotate the ball from the open position (e.g., 0-degree position) towards the closed position (e.g., the 90-degree position). The amount of rotation corresponds to the duration of the first pulse 202. The amount of rotation may be 2 degrees. In other examples the amount of rotation may be less than 15 degrees, less than 10 degrees, less than 5 degrees, less than 4 degrees, less than 3 degrees, or less than 2 degrees. In some valve configurations, rotating the ball by 2 degrees from the fully open position may not result in any substantial impediment to the flow through the valve. For example, the valve may begin in the fully open state and remain in the fully open state after rotation. As such, the ball may be left in the 2-degree position for the remainder of the period. At the end of the first period, the second pulse 204 is generated. The second pulse 204 has the same duration and amplitude as the first pulse 202, but the second pulse 204 has a negative polarity rather than a positive polarity. Accordingly, the negative second pulse 204 causes the actuator to rotate the ball in the opposite direction. In the present example, the second pulse 204 causes the actuator to rotate the ball back to the fully open position. For instance, the second pulse 204 may cause the ball to rotate from the 2-degree position that resulted from the first pulse 202 back to the 0-degree position.

The pulse pattern depicted in FIG. 2A may be appropriate for reducing resistance of a valve that is normally in a closed position. In an example where a negative pulse causes the actuator to rotate the ball towards the open position, the pulse pattern may begin with the second pulse 204. In such an example, when the negative second pulse 204 is generated and received by the actuator, the actuator rotates the ball slightly towards the fully open position. For example, the second pulse may cause the ball to rotate 2 degrees from the 90-degree position towards the fully open position (e.g., the 0-degree position) resulting in the ball being in an 88-degree position. The position of the ball after the second pulse 204 may still cause the valve to be in the fully closed state and prevent all flow of fluid because no part of the bore of the ball is aligned or exposed to the flow of fluid. Accordingly, the ball may remain in the 88-degree position for the remainder of the period while still preventing all flow of fluid. Thus, the second pulse 204 prevents sticking of the valve while also preserving the full functionality of the valve. At the end of the period starting from the second pulse 204, the third pulse 206 is generated and received by the actuator. The third pulse 206 causes the actuator to rotate the ball from the slightly open position back to the fully closed position. Continuing with the present example, the third pulse 206 may cause the ball to rotate from the 88-degree position to the 90-degree position.

Figure 2B:
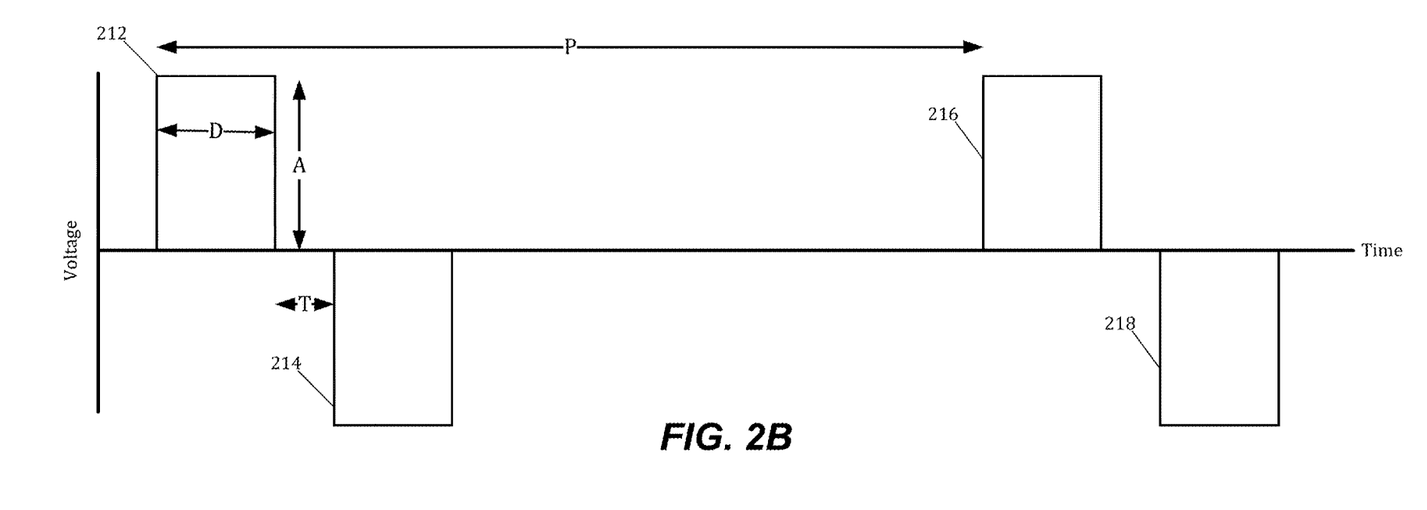
FIG. 2B depicts another example series of electrical pulses.

FIG. 2B depicts another example series of pulses 212-218. The pulse series is provided as a series of "pulse pairs." The pulse pairs include a positive pulse and a negative pulse in sequence with one another offset by a time interval (T). In examples where pulse pairs are implemented, the period (P) is measured from the beginning of the each of the pulse pairs. For instance, in the example depicted, the period (P) is measured from the beginning of the first pulse 212 to the beginning of the third pulse 216. The time interval (T) is substantially shorter than the period (P). In some examples, the time interval (T) may be on the order of milliseconds or seconds. In such examples, the ratio of the time interval (T) to the period (P) (the "TP Ratio") may be less than 1/50,000. In other examples, the TP ratio may be less than 1/100, less than 1/1,000, less than 1/10,000, or less than 1/100,000. While the pulse duration (D) of the pulses 212-218 is depicted as longer than the time interval (T), in many examples, the time interval (T) may be longer than the pulse duration (D).

The pulse pattern of pulse pairs depicted in FIG. 2B may be appropriate for a valve in a closed position where some amount of fluid leak through the valve is desired. As one example, where the valve is controlling the flow of water, some flow of water through the valve may be desired to prevent bacterial growth or freezing. The amount of water flow may be based on the particular system in which the valve is implemented. For example, a small drip of water for some time may be appropriate in some systems, whereas a more substantial rush of water for a short time may be appropriate in some systems to flush out a portion of the system, such as flushing out humidifiers or evaporative coolers. In either example, it may be useful to have controlled drainage to catch or handle water that is released through the valve.

To achieve the result of an intermittent flow through the valve, the pulse pairs first open the valve and then close the valve after the time interval (T). For example, the first pulse pair in the series of pulses includes a first pulse 212 and a second pulse 214. The first pulse 212 has a positive polarity, and the second pulse 214 has a negative polarity. When the first pulse is generated and received by the actuator, the actuator rotates the ball to a partially open position to allow some fluid to flow through the valve. The amount of rotation may be based on the desired amount of flow through the valve. For instances where a high flow is desired, such as to intermittently flush out a system, the amount of rotation will be greater, and thus the pulse duration may be greater. The rotation may include rotations as large as a rotation to cause the ball to move to the fully open position. For instances where a low flow is desired, the amount of rotation will be smaller, and thus the pulse duration will be smaller. Subsequent to the first pulse 212, the ball remains in the open position for the time interval (T). The time interval (T) may be selected based on the amount of rotation caused by the first pulse 212. For instance, where a large rotation occurs, and thus a high flow occurs, the time interval (T) may be relatively short (e.g., a few seconds or less). In examples where a small rotation occurs, and thus a low flow or drip occurs, the time interval may be longer (e.g., 10 seconds or more). At the end of the time interval (T), the second pulse 214 is generated and provided to the actuator. The second pulse 214 causes the actuator to rotate the ball back towards the fully closed position and end the flow of fluid through the valve. In some examples, the second pulse 214 has the same duration and amplitude as the first pulse 212 to cause the ball to rotate back to the position from which it started prior to the first pulse 212 being generated. For instance, the second pulse 214 may cause the ball to return to the fully closed position.

The use of pulse pairs may also be used when the valve is in the fully open position. In such an example, the polarity of the pulse pairs may be switched such that first pulse in the pulse pair has a negative polarity and the second pulse in the pulse pair has a positive polarity. Accordingly, the pulse pair causes the ball to rotate towards a closed position and then back to the fully open position.

While only two pulse patterns have been discussed in FIGS. 2A-2B, it should be appreciated that many more pulse patterns are possible depending on the desired results and configurations of the valve and the valve circuitry. For example, while the examples of FIGS. 2A-2B illustrate consecutive pulses having opposite polarity, it is possible that in some examples multiple pulses are generated having the same polarity followed by multiple pulses in the opposite polarity. In addition, while the pulse patterns in FIGS. 2A and 2B are primarily discussed with respect to their applications to normally closed and normally open valves during particular situations or implementations, the pulse patterns may be applied to a valve that is in any position. Further, while the pulses are depicted as square-wave pulses, the pulses may be of any shape suitable to cause the desired rotation of the ball by the actuator. In addition, when referring to polarity of the pulses, the concept also includes providing pulses on different control lines with reference to a common wire. For example, in some implementations, the actuator may include a wire to receive a close signal, a wire to receive an open signal, and a common wire to allow current to flow. The polarity of the pulse may reference which wire the pulse is provided on. For example, a positive polarity pulse may reference a pulse that is provided on the close-signal wire, and a negative polarity pulse may reference a signal provided on the open-signal wire. In other examples, the polarity references may be switched.

In some examples, the actuator or other portion of the valve circuitry 114 may include one or more capacitors that are configured to automatically close the valve upon a trigger, such as power being removed from the valve or a loss of connection between the valve and a utility control device (discussed below), among other possibilities. In such valves, continuous power or a continuous open signal may be required to keep the valve in the fully open position. While the power is applied, a capacitor (e.g., in the actuator) charges and maintains a charge. When the power is removed (either intentionally or unintentionally) the charge in the capacitor is used by the actuator to rotate the valve back to the fully closed position. Accordingly, in such examples, the pulse to rotate the ball towards the open position is a pulse of power or a pulse of an open signal, similar to the pulses described above. No negative pulse, however, may be needed to return the ball back to the 0-degree position because upon cessation of the pulse of power, the capacitor discharges, which causes the ball to rotate back to the fully closed position. To help prevent sticking in the fully open position, the pulse to rotate the ball towards the closed position may be a lack of power (or lack of open signal) rather than a pulse of opposite polarity. For instance, to rotate the ball a small amount (e.g., a few degrees) towards the closed position, power may be removed from the valve for a pulse duration. The removal of power may be considered an off pulse. For the duration of the off pulse, the capacitor partially discharges, which causes the ball to rotate towards the closed position. At the end of the off pulse, when power is reapplied, the capacitor recharges and the ball is rotated back into the fully open position.

Figure 3:
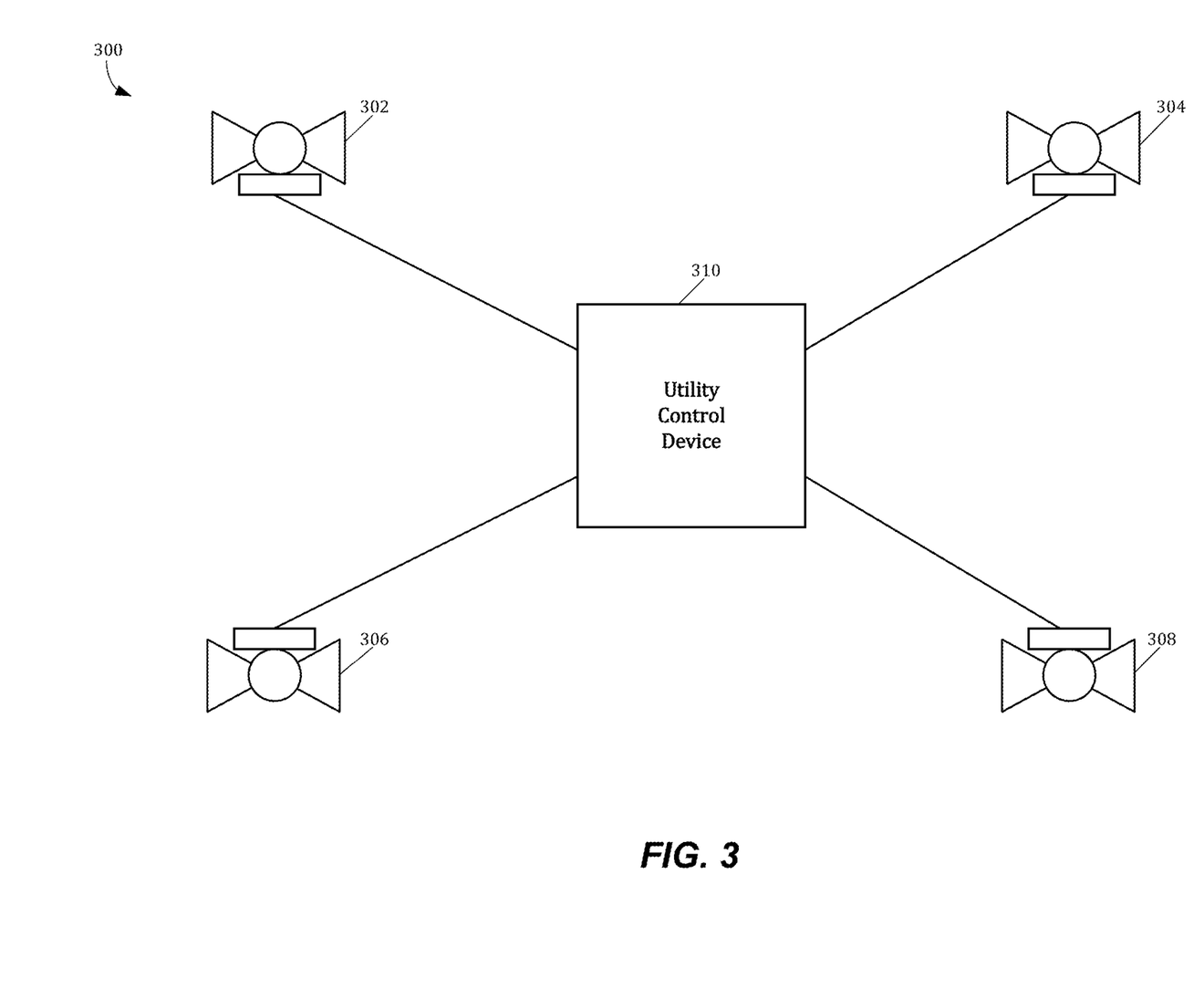
FIG. 3 depicts an example system for controlling a plurality of ball valves.

FIG. 3 depicts an example system 300 for controlling a plurality of ball valve systems 302-308. The ball valve systems 302-308 may each be controlled by a utility control device 310. Each of the ball valve systems 302-308 may include some or all of the components of the system 100 described above with respect to FIG. 1A. For example, each of the ball valve systems 302-308 may include a ball valve and valve circuitry.

The control signals and/or pulses provided to the ball valve systems 302-308, however, may be generated from the utility control device 310. The utility control device 310 may include a microprocessor, memory, and/or a microcontroller configured to perform the operations described herein. The utility control device 310 may also include any of the components of the valve circuitry 114 described above. One example of a device that may be modified to perform the functions of the utility control device 310 is the control panel described in U.S. Pat. No. 9,683,911, which is incorporated herein by reference in its entirety.

One or more of the pulse generation operations discussed above as being performed by the pulse generator in the valve circuitry may be performed by the utility control device 310. The general control signals for opening and closing the ball valve systems may also be generated by the utility control device. The utility control devices may also include the same input/output (IO) components of the valve circuitry described above. Accordingly, the duration, amplitude, polarity, and/or frequency of a series of pulses may be set at the utility control device 310. The series of pulses (or instructions to generate the series of pulses) may then be transmitted from the utility control device 310 to the ball valve systems 302-308. The transmission may be performed via a wired or wireless connection. The utility control device 310 may be operatively connected to the ball valve systems 302-308 by any suitable means. Among other possibilities, the utility control device 310 may be connected to the ball valve systems 302-308 by one or more Ethernet connection, and in some examples, by one or more Power over Ethernet (PoE) connection.

The pulses may be configured individually for each of the ball valve systems 302-308 that are in communication with the utility control device 310. For example, each of the valve systems 302-308 may include a separately addressable processor or other circuitry, including an identifier (such as a media access control (MAC) address, uniform resource locator, Internet Protocol (IP) address, or other suitable identifier) with which the utility control device 310 may communicate. For example, characteristics for a series of pulses transmitted to the first ball valve system 302 may be different than the characteristics for a series of pulses transmitted to the second ball valve system 304. Such a customization may be useful where the ball valve systems 302-308 are implemented in different conditions or are configured differently. For instance, the same series of pulses may not be appropriate for both a ball valve system that is controlling the flow of natural gas and a ball valve system controlling the flow of water. In some examples, the utility control device 310 may display, or cause the display on a separate device, a user interface to select particular valve system(s) 302-308 and apply the same series, or a different series, of pulses to such individual valve system(s) 302-308, as needed.

As discussed, the actuator or other portion of the valve circuitry 114 may include one or more capacitors that are configured to automatically close the valve upon a trigger, such as power being removed from the valve. For example, continuous power or a continuous open signal may be required to keep the valve in the fully open position. While the power is applied, a capacitor (e.g., in the actuator) charges and maintains a charge. When the power is removed (either intentionally or unintentionally) the charge in the capacitor may be used by the actuator to rotate the valve back to (or towards) the fully closed position. In examples where the valve systems 302-308 are connected to the utility control device 310 via a PoE connection, the interruption of that connection will also cause a loss of power to the valve system(s) 302-308, thereby causing the capacitor to discharge and close the valve, in such examples.

In other examples, power may be separately provided to the valve system(s) 302-308, but each valve system 302-308 may be configured to cause the actuator to move the valve to a fully closed position whenever the valve system 302-308 loses communication with the utility control device 310, even if the valve system 302-308 still is being supplied power. For example, valve circuitry 114 may be configured (e.g., via stored instructions for a microprocessor of valve circuitry 114) to monitor the connection with the utility control device 310 (by polling, pinging, or other suitable methods). If the valve circuitry 114 detects a loss of connection (or is unable to confirm the presence of an active connection), e.g., for a threshold period of time, the valve circuitry 114 may cause the actuator to rotate the ball of the ball valve to (or towards) a fully closed position.

Figure 4:
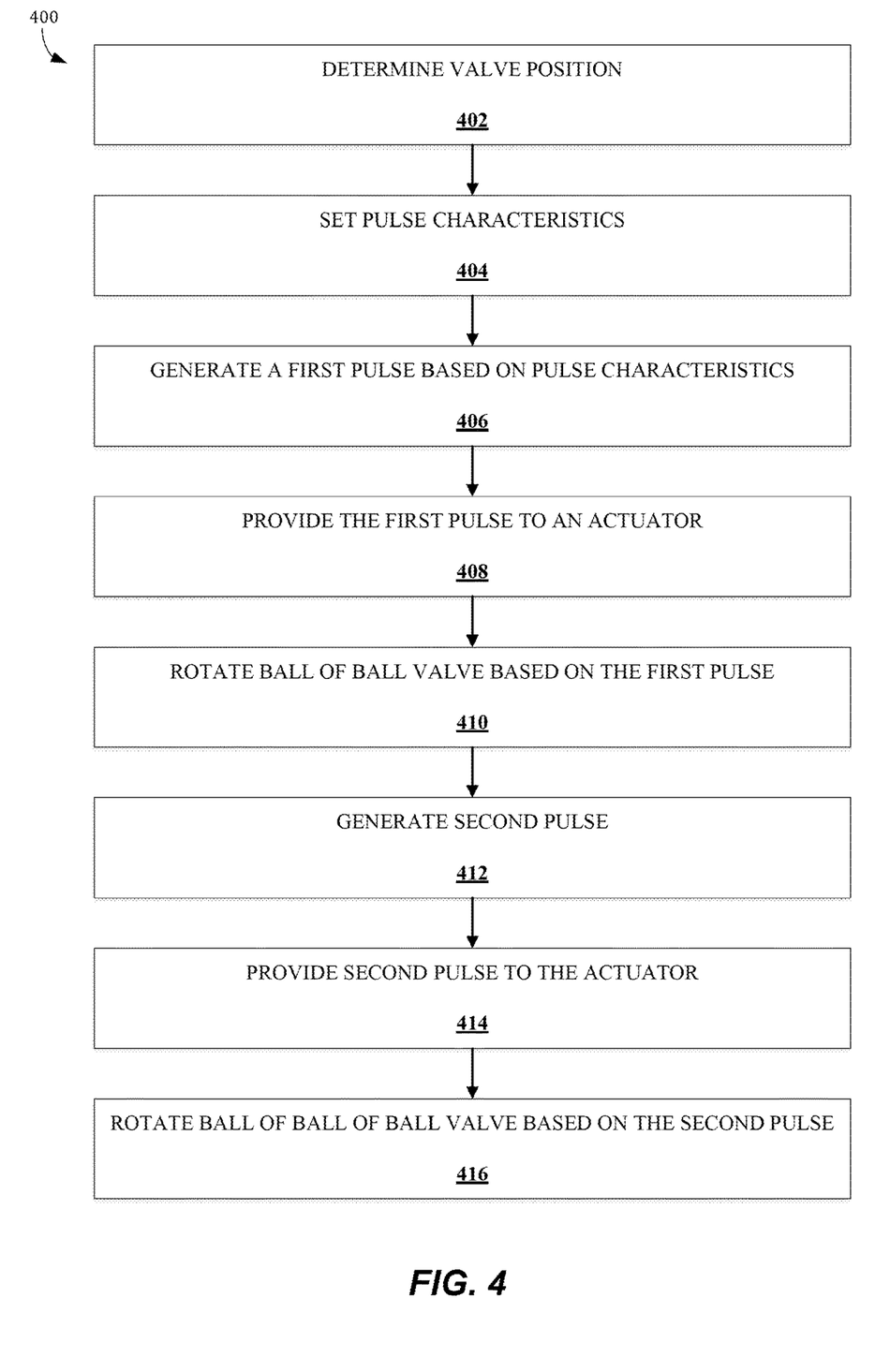
FIG. 4 depicts an example method for controlling a ball valve.

FIG. 4 depicts an example method 400 for controlling a ball valve. Operations of method 400 may be performed by any of the components described herein or a combination of such components. For instance, some operations may be performed by valve circuitry that is connected or attached to the ball valve. Some operations may also or alternatively be performed by a utility control device remotely located from the ball valve.

At operation 402, a position of the valve may be determined. The position of the valve may correspond to the position of the ball within the valve. The position may be determined based on signals provided by the actuator and/or by limit switches provided in the valve circuitry. For instance, in examples where the actuator is a control-loop actuator, the actuator may provide the position of the valve, or a signal corresponding to a position of the valve. In some examples, the limit switches may also provide positioning signals. For instance, a limit switch at the fully closed position may generate a signal, when the actuator triggers the limit switch, indicating that the valve is in the fully closed position. Similarly, a limit switch at the fully open position may generate a signal, when the actuator triggers the limit switch, indicating that the actuator is in the fully open position.

At operation 404, pulse characteristics may be set or determined. The pulse characteristics include the pulse duration, amplitude, and/or polarity. The pulse characteristics may also include the frequency of pulse generation and/or the period (P) between pulses. One or more of the pulse characteristics may be based on the valve position determined in operation 402. For example, the pulse polarity may be based on the determined valve position. In examples where the valve position is determined to be fully closed, the pulse polarity may be set to cause the actuator to rotate the ball of the valve towards the fully open position. In examples where the valve position is determined to be fully open, the pulse polarity may be set to cause the actuator to rotate the ball of the valve towards the fully closed position. In some examples, the pulse characteristics may also be based on input received from input components on the valve circuitry locally connected to the valve and/or input components of a utility control device. For instance, the duration of the pulse may be based on an input indicating the number of degrees that a user desires the ball of the valve to rotate or a setting indicating the purpose for which the valve is being used (e.g., gas, water, etc.). In some examples, at least one of the pulse characteristics may be preset when the valve circuitry is manufactured.

At operation 404, a first pulse is generated based on the pulse characteristics. The first pulse may be generated by a pulse generator of the valve circuitry locally connected to the valve and/or by a pulse generator of a utility control device remotely located from the valve. As discussed above, generation of the first pulse may be initiated by a microprocessor, a microcontroller, or an IC circuit, among other possible components.

At operation 408, the first pulse is provided to an actuator. In examples where the first pulse is generated locally, providing the first pulse to the actuator may including transmitting the first pulse over a wire or trace electrically connecting the pulse generator and the actuator. In examples where the pulse generator is located remote from the valve, the first pulse may be provided via a wired or a wireless connection.

At operation 410, the actuator receives the first pulse and rotates the ball of the valve based on the characteristics of the first pulse. The actuator may rotate the ball by rotating a valve stem that connects the actuator and the ball, as discussed above. The actuator rotates the ball of the valve based on the duration of the first pulse, and the direction of the rotation is based on the polarity of the first pulse. The amount of force provided by the actuator may be based on the amplitude of the first pulse. In some examples, the amount of rotation may be small, such as less than five degrees. For example, the valve may be in the fully closed state prior to rotation and remain in the fully closed state after rotation.

At operation 412, a second pulse is generated. The second pulse may be generated by same components that generated the first pulse. The second pulse may be generated after a period (P) from the time the first pulse was generated. The period (P) may be at least one hour or other time durations discussed herein. In other examples where the first pulse and the second pulse are a pulse pair, the second pulse may be generated a time interval (T) after the first pulse is generated.

The second pulse may be based on the pulse characteristics set or determined in operation 404 and/or the characteristics of the first pulse. For example, the second pulse may have a polarity that is opposite the polarity of the first pulse. Thus, the polarity of the second pulse may be based on the polarity of the first pulse. The duration of the second pulse may also be based on the duration of the first pulse. For instance, the second pulse may have the same or substantially the same duration as the first pulse. Accordingly, in examples, the second pulse causes the ball of the valve to rotate by the same amount, but in the opposite direction, as the ball rotated due to the first pulse. In some examples, the duration of the second pulse is longer than the duration of the first pulse. Having the duration of the second pulse be greater than the duration of the first pulse may help ensure that the valve returns to either the fully open or fully closed position. For instance, if the valve starts in the fully opened position and the first pulse causes the ball of the valve to rotate slightly towards the fully closed position, a longer duration for the second pulse having the opposite polarity from the first pulse will cause the ball to rotate back to the fully open position (e.g., the 0-degree position). Over-rotation past the fully open position may not be a concern where limit switches are in place to prevent such over-rotation.

At operation 414, the second pulse is provided to the actuator. The second pulse may be provided to the actuator in the same manner as the first pulse. At operation 416, the actuator receives the second pulse and rotates the ball of the ball valve based on the second pulse. For example, the actuator rotates the ball of the valve based on the duration of the second pulse, and the direction of the rotation is based on the polarity of the second pulse.

While not depicted, method 400 may continue to generate additional pulses, such as a third pulse and a fourth pulse. The third pulse may be substantially the same as the first pulse, and the fourth pulse may be substantially the same as the second pulse.

Figure 5:
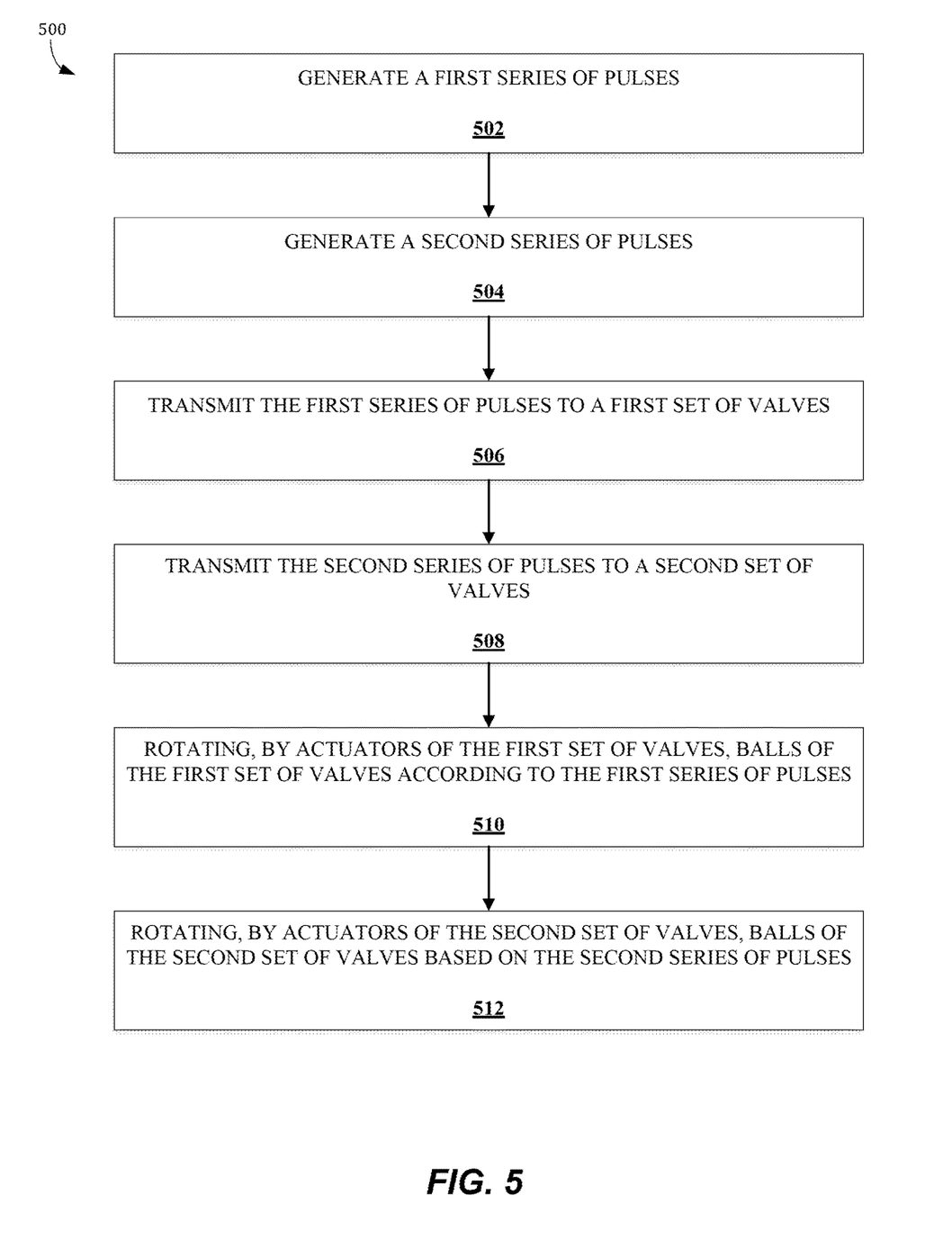
FIG. 5 depicts an example method for controlling multiple ball valves.

FIG. 5 depicts an example method 500 for controlling multiple ball valves. Operations of method 500 may be performed by any of the components descried herein or a combination of such components. For instance, some operations may be performed by a utility control device remotely located from the ball valve.

At operation 502, a first series of pulses may be generated. The series of pulses may include the first pulse and the second pulse generated in method 400. The first series of pulses may be based on prior pulses, a currently detected position of one or more valves in a first set of valves, or input received via input components, among other possible factors. For instance, a subset of valves that are under the control of the utility control device may share some common attributes that make that subset of valves suitable for resistance-reduction by the same series of pulses. As an example, a subset of valves may all be in the in the fully open or fully closed state or position. As another example, a subset of valves may all control gas or liquid. Accordingly, while not depicted, method 500 may also include determining the position of a plurality of valves and identifying subsets of valves sharing the same position.

The first series of pulses generated in operation 502 may include multiple pulse pairs, such as a first pulse pair and a second pulse pair. The first pulse pair includes a first pulse and a second pulse, and the second pulse pair includes a third pulse and a fourth pulse. The second pulse occurs a time interval (T) after the first pulse, and the fourth pulse may occur the time interval (T) after the third pulse. The third pulse occurs a period (P) after the first pulse. In some examples, the ratio between the time interval (T) and the period (P) is less than 1/100. The period (P) may be at least an hour. The first pulse may have a first polarity based on the position of the valve, and the second pulse may have a polarity opposite the polarity of the first valve. Similarly, the third pulse may have a polarity that is the same as the first pulse, and the fourth pulse may have a polarity that is the same as the second pulse. In other examples, during the period (P) the valve may move from a fully open position to a fully closed position, or vice-versa. In such an example, the third pulse may be based on the position of the valve, and therefore have a polarity opposite the polarity of the first pulse.

At operation 504, a second series of pulses is generated. The second series of pulses may be for a second set of valves, which may be a subset of valves that are controlled by the utility control device. The second series of pulses may be similar to the first series of pulses, but the characteristics of the second series of pulses may be different from the characteristics of the second series of pulses. For example, the duration, amplitude, and/or polarity of the pulses in the second series of pulses may differ from the pulses in the first series. The period (P) and/or the time interval (T) for the second series of pulses may differ from that of the first series of pulses. The characteristics of the second series of pulses may be based on prior pulses, a currently detected position of one or more valves in a second set of valves, or input received via input components, among other possible factors.

At operation 506, the first series of pulses is transmitted to the first set of valves. The first series of pulses may be transmitted via a wired or wireless connection. At operation 508, the second series of pulses is transmitted to the second set of valves. In examples, the first series of pulses may be different from the second series of pulses; for example, this may be the case where the purpose of the first set of valves (e.g., gas) is different from the second set of valves (e.g., water). In some examples, the first set of valves includes a single valve and the second set of valves includes a single valve. At operation 510, the actuators of the first set of valves rotate the balls of the valves according to or based on the first series of pulses. At operation 512, the actuators of the second set of valves rotate the balls of the valves according to or based on the second series of pulses.

Figure 6:
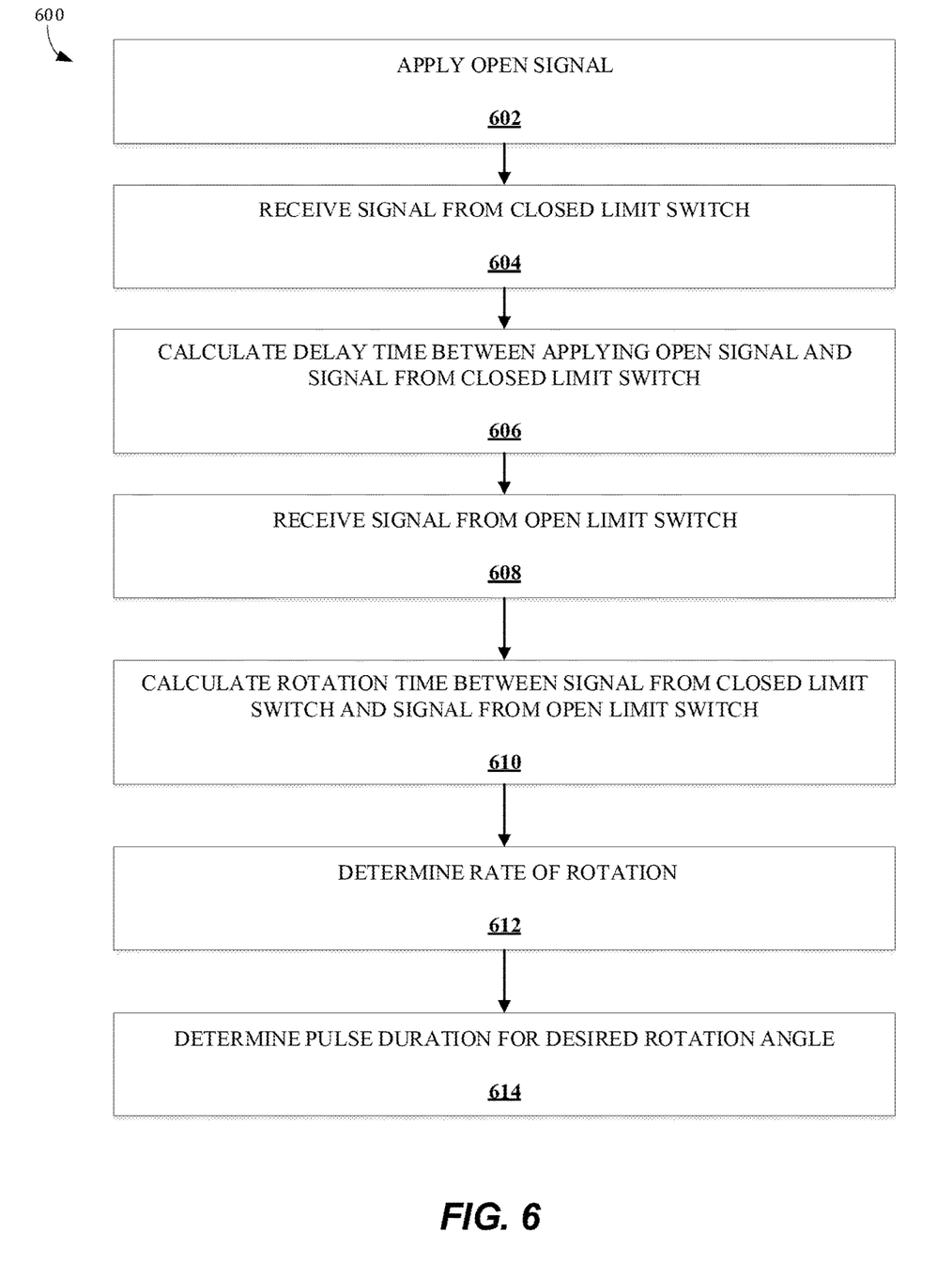
FIG. 6 depicts an example method for calibrating a control system for a ball valve.

FIG. 6 depicts an example method 600 for calibrating a control system for a ball valve. Different types of ball valves and actuators may require different types of pulses and may react differently when power is applied to the actuators. For instance, upon application of power or a signal, some actuators may have a delay before physical rotation of the ball actually occurs. In addition, the rotational speed at which the valve rotates may also vary between different valves and actuators. To account for these differences, the present technology may automatically calibrate to a connected actuator and ball valve to determine the proper pulse durations. One such example calibration method is depicted in FIG. 6 as method 600. In method 600, the valve for which calibration is being performed is a valve that has a closed limit switch for the fully closed position, such as the 90-degree position, and an open limit switch for the fully open position, such as the 0-degree position. The method 600 begins with the valve in the fully closed position that may be indicated by a signal from the closed limit switch.

At operation 602, a signal is applied to the actuator of the valve to open the valve. The signal may be a positive voltage or other type of signal that is configured to cause the particular actuator being calibrated to turn the valve towards the fully open position. As used herein, the signal may be referred to as an "open signal." The start of the open signal occurs at time $T_0$.

At operation 604, while the open signal is still being applied, a signal from the closed limit switch is received indicating that the ball valve has moved from the position in contact with the limit switch (e.g., the 90-degree position). The received signal indicates that the valve has begun rotating towards the fully open position. The received signal from the closed limit switch occurs at time $T_1$. At operation

606, a delay time ($T_{delay}$) between applying the open signal and receiving the signal from the closed limit switch is calculated. The delay time ($T_{delay}$) may be equal to $T_1$-$T_0$.

At operation 608, a signal is received from the open limit switch indicating that the valve has reached the fully open position and/or has reached the position of the open limit switch. The signal from the open limit switch is received at time $T_3$. At operation 610, a rotation time ($T_{Rot}$) is calculated. The rotation time ($T_{Rot}$) is the duration of time that occurred between the start of rotation from the fully closed position to the time the valve reached the fully open position. The rotation time ($T_{Rot}$) is equal to $T_3$-$T_2$.

At operation 612, a rate of rotation ($R_{Rot}$) is determined. The rate of rotation ($R_{Rot}$) may be represented in time per degree of rotation. The rate of rotation ($R_{Rot}$) may be determined by dividing the rotation time ($T_{Rot}$) by the number of degrees ($N_{Total}$) that the ball of the valve rotated. In an example, the ball may rotate 90 degrees from the fully closed position to the fully open position. At operation 614, a pulse duration (D) for a desired rotation angle or desired number of degrees of rotation ($N_{Desired}$) is determined. The pulse duration (D) may be determined based on the determined rate of rotation ($R_{Rot}$) and the determined delay time ($T_{Delay}$) for the particular valve for which the calibration is being performed. For instance, the pulse duration (D) for a desired number of degrees of rotation ($N_{Desired}$) may be determined by the following equation:

$$D=N_{Desired}R_{Rot}+T_{Delay}$$

As an example, an example valve may take a total rotation time ($T_{Rot}$) of 5 seconds to rotate 90 degrees ($N_{Total}$) and may have a delay time ($T_{delay}$) of 50 milliseconds (ms). In such an example, the rate of rotation ($R_{Rot}$) is about 55 ms per degree. Accordingly, to rotate the valve by 2 degrees, a pulse duration (D) of about 160 ms may be used.

The method 600 may be performed when a control system or device is initially connected to the actuator of a ball valve. The method 600 may also be periodically repeated to check that calculated rates of rotation and delay times have not changed for the valve. As should be appreciated, the principles of method 600 may also be applied for the valve rotating in the opposite direction. For instance, the valve may begin in a fully open state and the time to rotate the valve to the fully closed position may be calculated. Similar delay times and rotation rates may then be calculated for rotating the valve in a direction from open to closed.

It should be appreciated that while the present discussion provided herein primarily uses a two-way ball valve for purposes of providing examples, it should be appreciated that the technology provided herein may be applied to a multi-way ball valve (e.g., a three-way ball valve) to help prevent such a valve from sticking. The present technology may also be applicable to other valves that are susceptible to sticking.

In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

Numerous other changes may be made which will readily suggest themselves to those skilled in the art and which are encompassed in the spirit of the disclosure and as defined in the appended claims. While various aspects have been described for purposes of this disclosure, various changes and modifications may be made which are well within the scope of the present invention. Numerous other changes may be made which will readily suggest themselves to those skilled in the art and which are encompassed in the spirit of the disclosure and as defined in the claims.

Further, as used herein and in the claims, the phrase "at least one of element A, element B, or element C" is intended to convey any of: element A, element B, element C, elements A and B, elements A and C, elements B and C, and elements A, B, and C. In addition, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

What is claimed is:

1. A system for reducing resistance of a ball valve, the system comprising:
   a ball valve, comprising a ball with a bore;
   an actuator, operatively connected to the ball valve, and configured to rotate the ball of the ball valve; and
   pulse generator circuitry, operatively connected to the actuator and configured to:
     generate a first pulse having a duration and a first polarity;
     provide the first pulse to the actuator to rotate the ball of the ball valve by an amount based on the duration of the first pulse and a direction based on the first polarity, wherein the first pulse is configured so that, when the ball valve is in a closed state before rotation of the ball by the amount, the ball valve remains in the closed state after rotation of the ball by the amount.

2. The system of claim 1, wherein the amount is less than fifteen degrees.

3. The system of claim 1, wherein the pulse generator circuitry is further configured to provide, to the actuator, a second pulse having a second polarity opposite the first polarity.

4. The system of claim 3, wherein the pulse generator circuitry is further configured to provide, to the actuator, a third pulse having the first polarity, wherein the third pulse is provided prior to the second pulse.

5. The system of claim 1, wherein the pulse generator circuitry is locally connected to the ball valve.

6. The system of claim 1, wherein the pulse generator circuitry comprises a utility control device located remote from the ball valve.

7. The system of claim 1, wherein the pulse generator circuitry comprises:
   at least one processor; and
   memory, operatively connected to the at least one processor and storing instructions that, when executed by the at least one processor, cause the pulse generator circuitry to generate the first pulse.

8. A system for reducing resistance of a ball valve, the system comprising:
   pulse generator circuitry, configured to perform a method, the method comprising:
     generating a series of pulses, including a first pulse and a second pulse, wherein:
       the first pulse has a first duration and a first polarity; and the second pulse has a second duration and a second polarity, wherein the second polarity is opposite the first polarity; and transmitting the series of pulses to a first actuator configured to control the position of a ball of a first ball valve.

9. The system of claim 8, wherein the first pulse and the second pulse are provided as a first pulse pair.

10. The system of claim 9, wherein:
the series of pulses includes a second pulse pair that includes a third pulse and a fourth pulse; and
the second pulse pair is provided a period (P) after the first pulse pair is provided.

11. The system of claim 10, wherein the second pulse is provided a time interval (T) after the first pulse is provided, wherein a ratio between the time interval (T) and the period (P) is less than 1/100.

12. The system of claim 9, further comprising:
the first actuator, configured to receive the series of pulses and rotate the ball of the first ball valve according to the series of pulses;
wherein, upon a trigger, at least one of the first actuator and the pulse generator circuitry causes the first actuator to rotate the ball of the first ball valve to a fully closed position; and
wherein the trigger comprises one of a loss of power to the first ball valve or a loss of connection between the first ball valve and a remote utility control device.

13. The system of claim 12,
wherein at least one of the first actuator or the pulse generator circuitry includes a capacitor that is charged when power is applied to the first ball valve;
wherein, upon the trigger, the capacitor is discharged to cause the first actuator to rotate the ball of the first ball valve to the fully closed position.

14. The system of claim 8, wherein the pulse generator circuitry is further configured to provide, to the first actuator, a third pulse having the first polarity, wherein the third pulse is provided prior to the second pulse.

15. The system of claim 8, wherein the system further comprises:
the first ball valve; and
the first actuator, configured to receive the series of pulses and rotate the ball of the first ball valve according to the series of pulses.

16. The system of claim 8, wherein the pulse generator circuitry is locally connected to the first ball valve.

17. The system of claim 8, wherein pulse generator circuitry comprises a utility control device located remotely from the first ball valve.

18. The system of claim 17, wherein the method further comprises, transmitting, by the utility control device, the series of pulses to at least a second actuator to control at least a second ball valve.

19. The system of claim 17, wherein the method further comprises, transmitting, by the utility control device, a different series of pulses to at least a second actuator to control at least a second ball valve, wherein the second actuator is addressable by the utility control device separately from the first actuator.

20. A system for reducing resistance of a ball valve, the system comprising:
a utility control device comprising circuitry configured to perform a method, the method comprising:
causing a first series of pulses to be generated, including a first pulse and a second pulse, wherein:
the first pulse has a first duration and a first polarity; and
the second pulse has a second duration and a second polarity, wherein the second polarity is opposite the first polarity;
causing the first series of pulses to be transmitted to a first actuator configured to control the position of a first ball of a first ball valve;
causing a second series of pulses to be generated, including a third pulse and a fourth pulse, wherein:
the third pulse has a third duration and a third polarity; and
the fourth pulse has a fourth duration and a fourth polarity, wherein the fourth polarity is opposite the third polarity; and
causing the second series of pulses to be transmitted to a second actuator configured to control the position of a second ball of a second ball valve;
wherein the third duration is different from the first duration.

* * * * *